(12) United States Patent
Shiga et al.

(10) Patent No.: US 11,283,943 B2
(45) Date of Patent: Mar. 22, 2022

(54) SYSTEM FOR REGISTRATION AND PRINTING DATA HAVING VOICE CONTROL DEVICE AND PRINTING APPARATUS

(71) Applicant: CANON KABUSHIKI KAISHA, Tokyo (JP)

(72) Inventors: Toshiki Shiga, Yokohama (JP); Ayumi Kabata, Yokohama (JP); Ryohei Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/889,027

(22) Filed: Jun. 1, 2020

(65) Prior Publication Data

US 2020/0296237 A1    Sep. 17, 2020

Related U.S. Application Data

(63) Continuation of application No. 16/110,441, filed on Aug. 23, 2018, now Pat. No. 10,708,448.

(30) Foreign Application Priority Data

Aug. 31, 2017    (JP) .............................. JP2017-167761

(51) Int. Cl.
*H04N 1/00*    (2006.01)
(52) U.S. Cl.
CPC ..... *H04N 1/00403* (2013.01); *H04N 1/00244* (2013.01); *H04N 1/00488* (2013.01); *H04N 1/00962* (2013.01)
(58) Field of Classification Search
CPC ................ G08C 2201/31; G04G 21/06; G05B 2219/24094; G05B 2219/14096; G05B 2219/32014; G05B 2219/23373; G05B 2219/39441; G05B 2219/23386; G05B 2219/13169; G05B 2219/35453; G06F 3/167; G10H 1/053; G10H 1/14; G10H 5/005; H04M 1/271; H04M 2250/74; H04N 1/32784; H04N 1/00403; G08G 1/096872; G03G 2215/00122; H04L 2012/6481; H04L 2012/00403
See application file for complete search history.

(56) References Cited

U.S. PATENT DOCUMENTS 6,975,993 B1 * 12/2005 Keiller .................... G10L 15/26
704/275
2002/0013701 A1 * 1/2002 Oliver ................ H04N 1/32128
704/231

(Continued)

FOREIGN PATENT DOCUMENTS

JP    2015200943 A    11/2015
JP    2017111775 A    6/2017
JP    2017130214 A    7/2017

*Primary Examiner* — Juan M Guillermety
(74) *Attorney, Agent, or Firm* — Canon U.S.A., Inc. IP Division

(57) ABSTRACT

A system including at least one server includes an obtaining unit that, in a case where a print instruction is issued by voice to a voice control device, obtains information based on the print instruction, and a generation unit that generates print data based on the obtained information, where the generation unit generates the print data by using a previously registered print setting when a print setting is not included in the obtained information.

14 Claims, 15 Drawing Sheets

(56) References Cited

U.S. PATENT DOCUMENTS

| | | | |
|---|---|---|---|
| 2013/0297320 A1* | 11/2013 | Buser | G10L 15/22 704/275 |
| 2016/0125177 A1* | 5/2016 | Kashiyama | G06F 21/31 726/10 |
| 2017/0264765 A1* | 9/2017 | Nobutani | G06F 21/32 |

* cited by examiner

FIG.13

| ID | SETTING ITEM | SETTING VALUE |
|---|---|---|
| 1 | NUMBER OF COPIES | 1 - 9999 |
| 2 | SHEET TYPE | PLAIN PAPER, PHOTOGRAPHIC PAPER, FINE ART PAPER, ENVELOPE, POSTCARD, ... |
| 3 | PRINT QUALITY | FINE, STANDARD, DRAFT, ... |
| 4 | COLOR | COLOR, MONOCHROME, AUTO |
| 5 | DOUBLE-SIDED PRINT | DOUBLE-SIDED, SINGLE-SIDED |
| 6 | SHEET SIZE | LETTER, LEGAL, A5, A4, A3, B5, L SIZE, 2L SIZE, ... |
| 7 | SHEET DIRECTION | VERTICAL, HORIZONTAL, AUTO |
| 8 | PAGE LAYOUT | DIRECT, BORDERLESS ENTIRE SURFACE, LAYOUT (2 PAGE/SHEET), ... |
| 9 | BINDING DIRECTION | LONG SIDE LEFT BINDING, LONG SIDE RIGHT BINDING, SHORT SIDE LEFT BINDING, SHORT SIDE RIGHT BINDING |
| 10 | PAGE SPECIFICATION | ALL, SELECTED PORTION, CURRENT PAGE, SPECIFIED PAGE |
| 11 | ... | ... |

FIG.14

|  | PRINT SETTING 1 (PICTURE) | PRINT SETTING 2 (DOCUMENT) |
|---|---|---|
| NUMBER OF COPIES | 1 | 1 |
| SHEET TYPE | PHOTOGRAPHIC PAPER | PLAIN PAPER |
| PRINT QUALITY | FINE | STANDARD |
| COLOR | COLOR | AUTO |
| DOUBLE-SIDED PRINT | SINGLE-SIDED | DOUBLE-SIDED |
| SHEET SIZE | L SIZE | A4 |
| SHEET DIRECTION | AUTO | AUTO |
| PAGE LAYOUT | BORDERLESS ENTIRE SURFACE | 2 PAGE/SHEET |
| BINDING DIRECTION | — | LONG SIDE LEFT BINDING |
| PAGE SPECIFICATION | ALL | ALL |
| . . . | . . . | . . . |

SYSTEM FOR REGISTRATION AND PRINTING DATA HAVING VOICE CONTROL DEVICE AND PRINTING APPARATUS

CROSS REFERENCE TO RELATED APPLICATIONS

The present application is a continuation of U.S. patent application Ser. No. 16/110,441 filed on Aug. 23, 2018, which claims priority from Japanese Patent Application No. 2017-167761 filed Aug. 31, 2017, which are hereby incorporated by reference herein in their entirety.

BACKGROUND

Field

The present disclosure relates to a system, a voice control device, and a printing apparatus.

Description of the Related Art

Japanese Patent Application Laid-Open No. 2015-100020 describes a technique for executing a print instruction in response to pressing of a print button displayed on a mobile terminal.

However, according to the technique described in Japanese Patent Application Laid-Open No. 2015-100020, a user needs to press the print button to instruct printing. Recently, printing apparatuses have been used in various situations, and techniques are required for further improving operability of print instructions.

SUMMARY

The present disclosure is directed to a system including at least one server that includes an obtaining unit configured to, in a case where a print instruction is issued by voice to a voice control device, obtain information based on the print instruction and a generation unit configured to generate print data based on the obtained information, wherein the generation unit generates the print data by using a previously registered print setting when a print setting is not included in the obtained information.

Further features will become apparent from the following description of exemplary embodiments with reference to the attached drawings.

BRIEF DESCRIPTION OF THE DRAWINGS

FIG. 13 illustrates an example of print setting items.
FIG. 14 illustrates an example of registered print settings.

DESCRIPTION OF THE EMBODIMENTS

Figure 1:
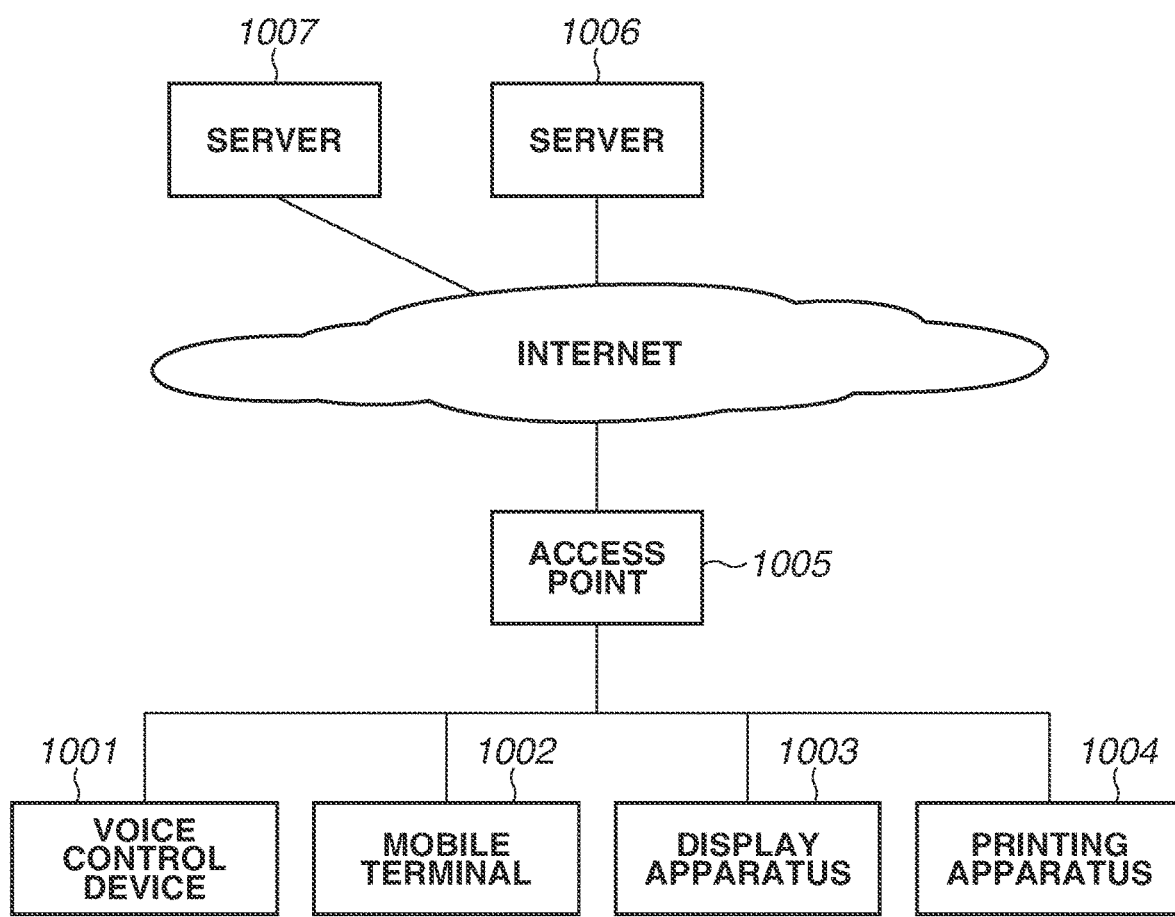
FIG. 1 is an example of a system configuration diagram.

FIG. 1 illustrates an example of a system configuration according to a first exemplary embodiment. The system according to the present exemplary embodiment includes, for example, a voice control device 1001, a mobile terminal 1002, a display apparatus 1003, a printing apparatus 1004, an access point (AP) 1005, and a server 1006 (an information processing apparatus). The voice control device 1001 is, for example, a smart speaker. The mobile terminal 1002 is an arbitrary mobile terminal such as a smartphone, a notebook personal computer (PC), a tablet terminal, or a personal digital assistant (PDA). In the below description, the mobile terminal 1002 is a smartphone. The present exemplary embodiment can be applied to not only a mobile terminal but also a desktop type PC. A mobile terminal can be referred to as a terminal device in the below description. The display apparatus 1003 is an apparatus including a display function such as a television and a display. The printing apparatus 1004 is, for example, a printer, but can be a copying machine, a facsimile device, or a digital camera. The printing apparatus 1004 can be a multifunction peripheral including a plurality of functions such as a copying function, a facsimile function, and a print function. In the below description, the printing apparatus 1004 is a printer such as an inkjet printer, a full color laser beam printer, or a monochromatic printer.

The voice control device 1001, the mobile terminal 1002, the display apparatus 1003, and the printing apparatus 1004 can be connected to (can communicate with) the server 1006 via the AP 1005 and the Internet. The voice control device 1001, the mobile terminal 1002, the display apparatus 1003, and the printing apparatus 1004 can be connected to (can communicate with) each other via the AP 1005.

[Configuration of Voice Control Device 1001]

Figure 2:
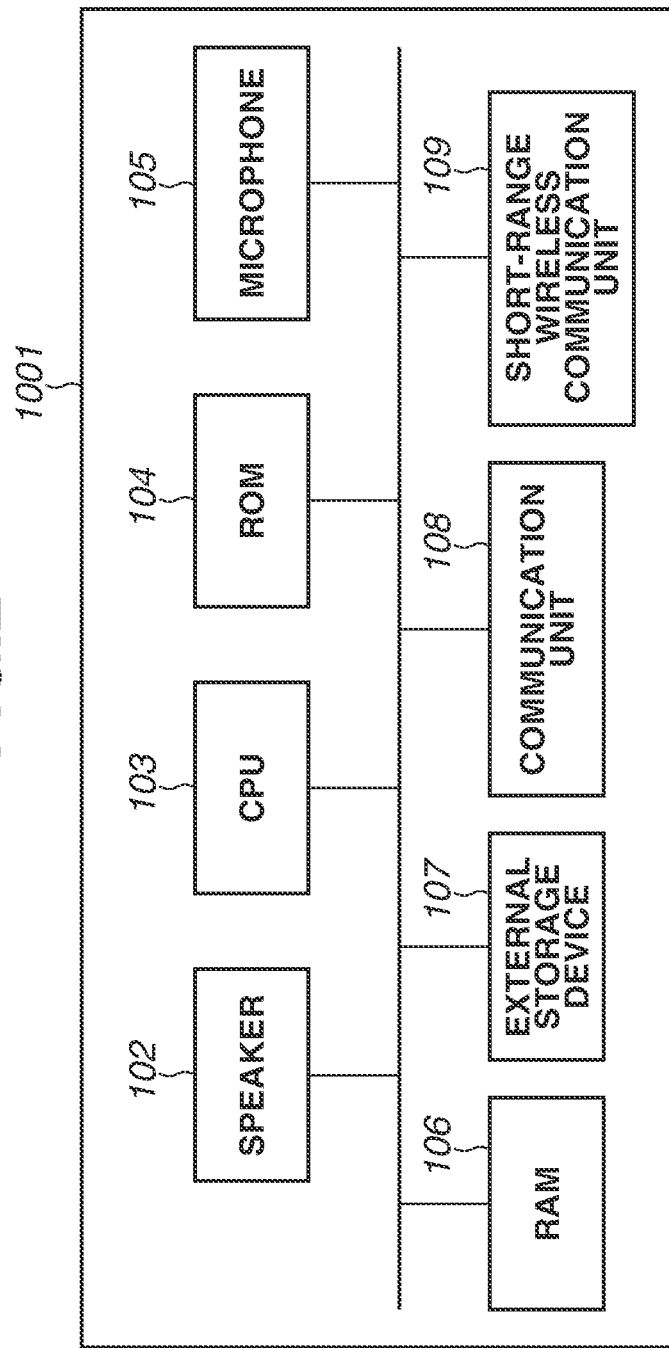
FIG. 2 illustrates an example of a hardware configuration of a voice control device.

FIG. 2 is a hardware configuration diagram of the voice control device 1001. The voice control device 1001 includes a speaker 102, a central processing unit (CPU) 103, a read only memory (ROM) 104, a microphone 105, a random access memory (RAM) 106, an external storage device 107, a communication unit 108, and a short-range wireless communication unit 109. Blocks illustrated in FIGS. 2 to 4 and 8 are mutually connected using, for example, internal buses. These configurations are examples, and each apparatus may include hardware other than the illustrated ones. A plurality of blocks in FIGS. 2 to 4 and 8 can be integrated into one block, and one block can be divided into two or more blocks. In other words, each apparatus can have arbitrary configuration within a range in which below-described processing can be executed.

The speaker 102 generates a voice by below-described processing. The CPU 103 is a system control unit and entirely controls the voice control device 1001. The ROM 104 stores a control program executed by the CPU 103, a data table, fixed data of an embedded operating system (OS) program, and the like. According to the present exemplary embodiment, each control program stored in the ROM 104 is used to control software execution, such as scheduling, task switching, and interrupt processing, under control of an embedded OS stored in the ROM 104. The microphone 105 receives voices around the voice control device 1001. For example, the RAM 106 for receiving a user's voice includes a static RAM (SRAM), which requires a backup power supply. The RAM 106 can store data such as a program control variable without volatilizing the data since the data is retained by a primary battery for data backup, which is not illustrated. The RAM 106 includes a memory area for storing setting information, management data, and the like of the voice control device 1001. The RAM 106 is also used as a main memory and a work memory of the CPU 103. The external storage device 107 stores application software.

The communication unit 108 includes a circuit and an antenna for performing communication according to a predetermined wireless communication method. For example, the communication unit 108 can be wirelessly connected to the AP 1005. In addition, the communication unit 108 can operate as an AP to be temporarily used. The AP 1005 can be a device such as a wireless local area network (LAN) router. Wireless communication used in the present exemplary embodiment can operate according to a wireless LAN wireless communication method conforming to Institute of Electrical and Electronics Engineers (IEEE) 802.11 specification series or according to another wireless communication method. According to the present exemplary embodiment, IEEE 802.11 specification series includes a series of specifications belonging to IEEE 802.11, such as IEEE 802.11a and IEEE 802.11b.

The short-range wireless communication unit 109 executes short-range wireless communication with another apparatus existing within a certain range (within a short distance range) from the voice control device 1001. The short-range wireless communication unit 109 performs communication by a wireless communication method different from that of the communication unit 108. According to the present exemplary embodiment, the short-range wireless communication unit 109 operates according to Bluetooth® standard. According to the present exemplary embodiment, a communication speed of wireless communication using the communication unit 108 is faster than a communication speed of short-range wireless communication using the short-range wireless communication unit 109. According to the present exemplary embodiment, a communication distance of the wireless communication using the communication unit 108 is longer than a communication distance of the short-range wireless communication using the short-range wireless communication unit 109. The same is applied to a communication unit and a short-range wireless communication unit in another apparatus described below.

[Configuration of Mobile Terminal 1002 and Display Apparatus 1003]

Figure 3:
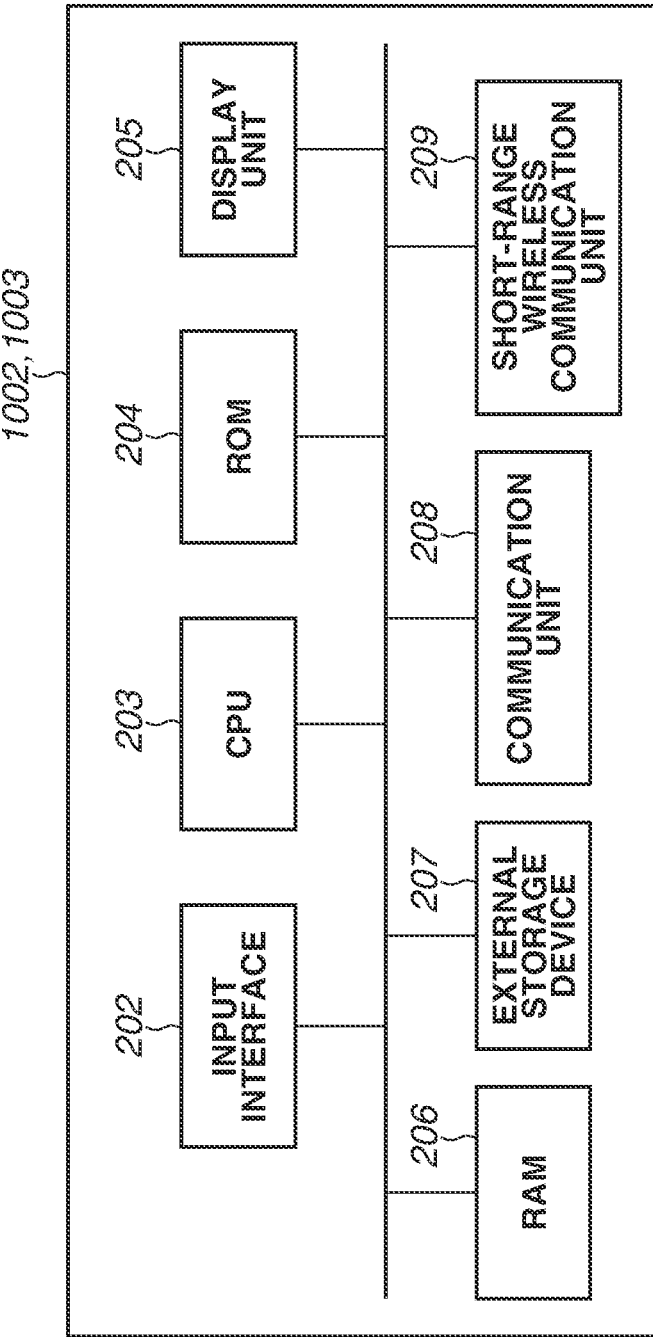
FIG. 3 illustrates an example of a hardware configuration of a mobile terminal and a display apparatus.

FIG. 3 is a hardware configuration diagram of the mobile terminal 1002 and the display apparatus 1003. The mobile terminal 1002 and the display apparatus 1003 each include, for example, an input interface 202, a CPU 203, a ROM 204, a display unit 205, a RAM 206, an external storage device 207, a communication unit 208, and a short-range wireless communication unit 209. These blocks are mutually connected by, for example, internal buses.

The CPU 203 is a system control unit and entirely controls the device. The RAM 206 includes a dynamic RAM (DRAM), which requires a backup power supply as with, for example, the RAM 106. The RAM 206 is also used as a main memory and a work memory of the CPU 203. The ROM 204 stores a control program executed by the CPU 203, a data table, fixed data of an OS program, and the like.

The communication unit 208 includes a function similar to that of the above-described communication unit 108 and can be wirelessly connected to the other apparatuses via the AP 1005. The short-range wireless communication unit 209 can perform short-range wireless communication between the short-range wireless communication unit 109 using a wireless communication method the same as that of the short-range wireless communication unit 109.

[Configuration of Printing Apparatus 1004]

Figure 4:
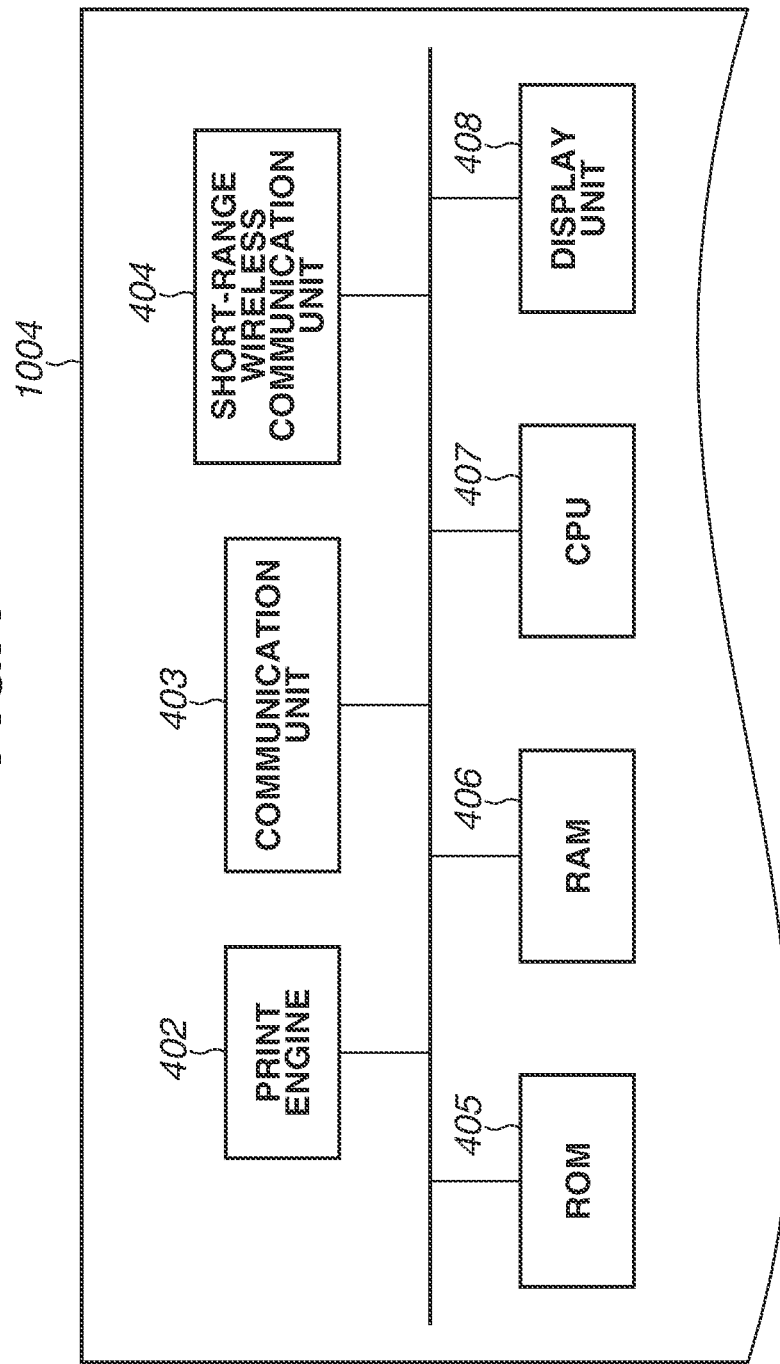
FIG. 4 illustrates an example of a hardware configuration of a printing apparatus.

FIG. 4 is a hardware configuration diagram of the printing apparatus 1004. The printing apparatus 1004 includes, for example, a print engine 402, a communication unit 403, a short-range wireless communication unit 404, a ROM 405, a RAM 406, a CPU 407, and a display unit 408.

The CPU 407 is a system control unit and entirely controls the printing apparatus 1004. The RAM 406 includes a DRAM, which requires a backup power supply as with, for example, the RAM 106. The RAM 406 is also used as a main memory and a work memory of the CPU 407. The ROM 405 stores a control program executed by the CPU 407, data table, fixed data of an OS program, and the like.

The communication unit 403 includes a function similar to that of the above-described communication unit 108 and can be wirelessly connected to the other apparatuses via the AP 1005. The short-range wireless communication unit 404 can perform short-range wireless communication between the short-range wireless communication unit 109 using a wireless communication method the same as that of the short-range wireless communication unit 109.

The print engine 402 forms an image on a recording medium, such as paper, using a recording agent, such as ink, based on a print job received via the communication unit 403 and outputs a printed result.

The display unit 408 is an interface for receiving data input and an operation instruction from a user and is an operation panel including a physical keyboard, buttons, a touch panel, and the like.

[Setup of Voice Control Device 1001]

Figure 5:
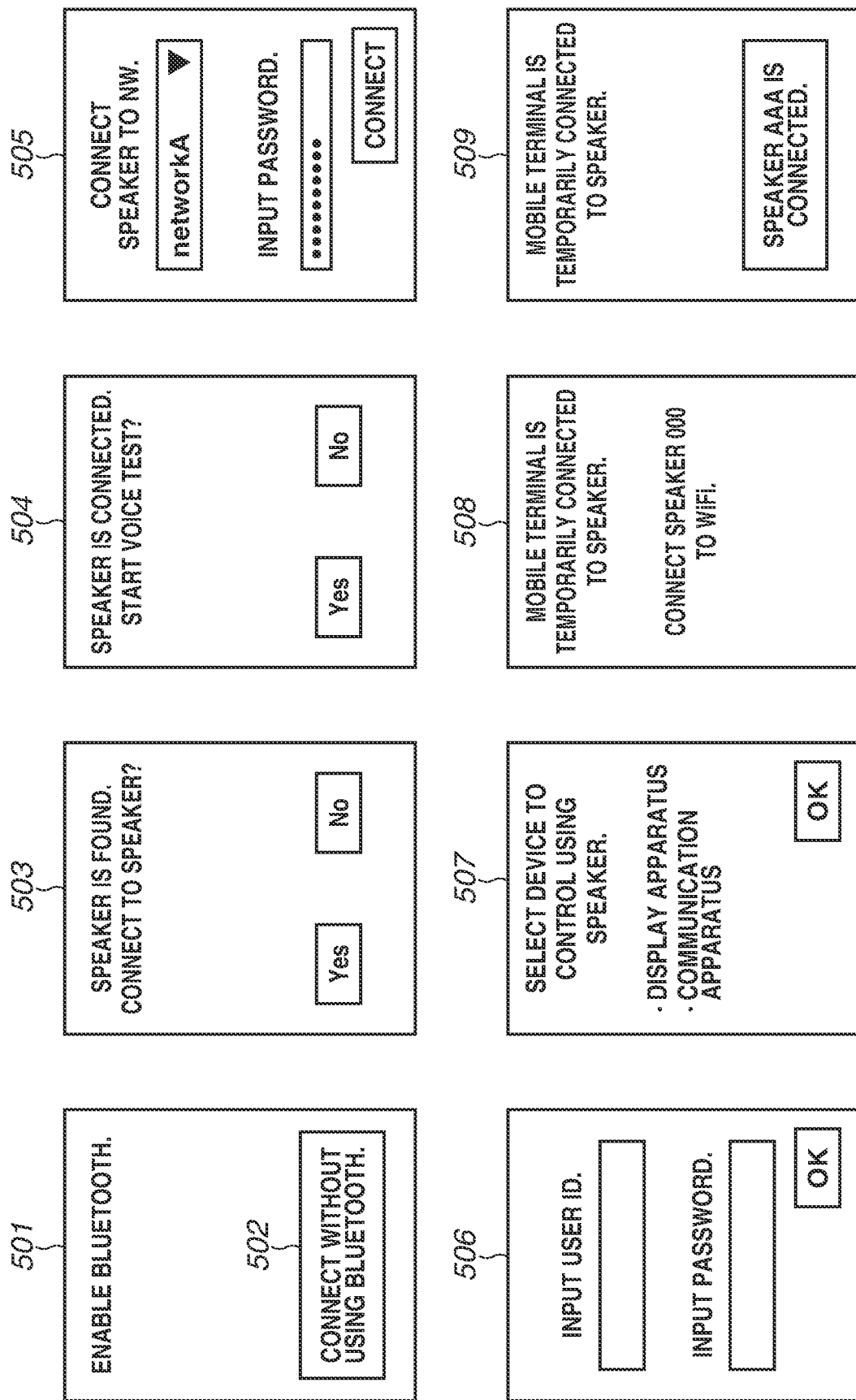
FIG. 5 illustrates an example of screens related to setup of the voice control device.

Next, setup of the voice control device 1001 is described with reference to FIG. 5. FIG. 5 is a schematic diagram illustrating an example of screens displayed by the mobile terminal 1002 for setup of the voice control device 1001. The mobile terminal 1002 is installed with a management application for the voice control device 1001.

When the management application is started by a user operation, a screen 501 is displayed on the display unit 205 of the mobile terminal 1002. The user enables the short-range wireless communication unit 209 (for example, Bluetooth®) of the mobile terminal 1002 according to a message described in the screen 501. When the voice control device 1001 is started, the voice control device 1001 transmits a beacon including a specific identifier. The mobile terminal 1002 displays a screen 503 when receiving the beacon transmitted by the voice control device 1001 using the management application. When a "YES" button is pressed on the screen 503, short-range wireless connection is established between the mobile terminal 1002 and the voice control device 1001.

When the short-range wireless connection is established between the mobile terminal 1002 and the voice control device 1001, a screen 504 is displayed on the display unit 205 of the mobile terminal 1002. When a user presses a "YES" button on the screen 504 in this situation, voice data is transmitted from the mobile terminal 1002 to the voice control device 1001 via the short-range wireless connection, and the speaker 102 of the voice control device 1001 outputs a voice. In the case that the voice control device 1001 outputs the voice, when the user presses a "test completion button" displayed next to the screen 504, a screen 505 is displayed on the display unit 205 of the mobile terminal 1002.

On the screen 505, the user inputs a service set identifier (SSID) and a password of an AP to which the user intends to connect the voice control device 1001 and presses a connection button. The user uses the screen 505 to input an SSID and a password of the AP 1005 already wirelessly connected by the mobile terminal 1002 using the communication unit 208 (the AP 1005 being wirelessly connected). According to the processing, the mobile terminal 1002 transmits the SSID and the password to the voice control device 1001 via the short-range wireless connection. The voice control device 1001 establishes wireless connection with the AP 1005 using the SSID and the password received via the short-range wireless connection. In other words, the voice control device 1001 participates in a network constructed by the AP 1005. By the above-described processing, the voice control device 1001 and the mobile terminal 1002 can perform wireless communication with each other via the AP 1005 (via the network constructed by the AP 1005).

Subsequently, the user inputs a user identification (ID) and a password for logging in to the server 1006 using a screen 506 displayed on the mobile terminal 1002. The user ID and the password input on the screen 506 are transmitted from the mobile terminal 1002 to the voice control device 1001 via the short-range wireless connection or the AP 1005. The voice control device 1001 signs in to the server 1006 using the user ID and the password received from the mobile terminal 1002. At that time, the voice control device 1001 also transmits a media access control (MAC) address of its own. Accordingly, the voice control device 1001 can use a service provided by the server 1006 to a user. In other words, the server 1006 manages the MAC address of the voice control device 1001 and the user ID by associating with each other. The voice control device 1001 can receive an access token of the server 1006.

The user uses a screen 507 displayed following the screen 506 to select a device that the user intends to control using the voice control device 1001. In this case, it is assumed that the user selects the display apparatus 1003 and the printing apparatus 1004 as illustrated in the screen 507. An apparatus to be displayed on the screen 507 is displayed such that the mobile terminal 1002 searches a device (an apparatus) in the network via the AP 1005. In this regard, the mobile terminal 1002 obtains a MAC address, an Internet protocol (IP) address, and the like of each apparatus in the device search as a result of the device search processing. Thus, when an OK button is pressed on the screen 507, the mobile terminal 1002 transmits the MAC address and the IP address of each apparatus to the voice control device 100.

The setup of the voice control device 1001 can be performed using another method. For example, when the voice control device 1001 is started (or a setup mode is enabled), the communication unit 108 of the voice control device 1001 can operate as a software AP, and the setup can be performed. As a specific example, when "Connect without using Bluetooth" 502 is pressed on the screen 501, the mobile terminal 1002 uses the communication unit 208 to establish wireless connection between the voice control device 1001 by a software AP function of the voice control device 1001. In this regard, when the communication unit 208 of the mobile terminal 1002 is already connected to the external AP 1005, a connection destination of the communication unit 208 of the mobile terminal 1002 is changed to the software AP of the communication unit 108 of the voice control device 100 as illustrated in a screen 508. In other words, the connection destination of the communication unit 208 of the mobile terminal 1002 is temporarily changed from the AP 1005 to the software AP of the communication unit 108 of the voice control device 1001 according to a user operation or an instruction from the management application. When wireless connection is established between the communication unit 208 of the mobile terminal 1002 and the communication unit 108 of the voice control device 1001 by the above-described control, a screen 509 is displayed.

As subsequent processing, information pieces (the SSID, the password, etc.) input to the screen 505 are transmitted via the wireless connection established between the communication unit 208 of the mobile terminal 1002 and the communication unit 108 of the voice control device 1001. Subsequently, the mobile terminal 1002 changes the connection destination to the AP 1005 so that the mobile terminal 1002 and the voice control device 1001 perform wireless communication via the AP 1005. Further, the voice control device 1001 disables the software AP and performs the wireless connection with the AP 1005 using the communication unit 108.

As described above, the voice control device 1001 can receive the information pieces (the SSID, the password, etc.) regarding the AP 1005 as an external access point from the mobile terminal 1002 by wireless communication using the access point included in the voice control device 1001. The voice control device 1001 can execute reception processing for receiving the information pieces (the SSID, the password, etc.) regarding the external AP 1005 from the mobile terminal 1002 via short-range wireless communication. The voice control device 1001 can include only any one or both of the above-described two reception processing functions. In addition, the voice control device 1001 can establish wireless communication by connecting to the external AP 1005 using another reception processing function.

[Sign-in Processing of Printing Apparatus 1004 to Server 1006]

Next, processing by the printing apparatus 1004 to sign in to the server 1006 is described. For example, in the Internet, there can be a server 1006 compatible with the voice control device 1001 and a server 1007 not compatible with the voice control device 1001. The printing apparatus 1004 is required to sign into the server 1006 to cooperate with the voice control device 1001.

Figure 6:
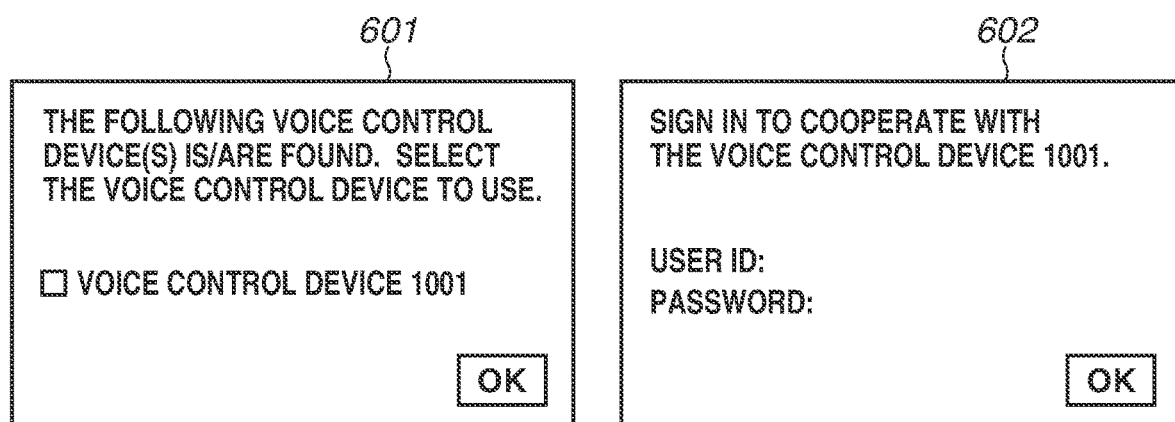
FIG. 6 illustrates an example of screens displayed by the printing apparatus.

Thus, the printing apparatus 1004 includes a voice control device cooperation mode. When the voice control device cooperation mode is enabled, the printing apparatus 1004 performs device search on the network in which the printing apparatus 1004 participates and finds the voice control device 1001. A screen 601 illustrated in FIG. 6 is displayed on the display unit 408 of the printing apparatus 1004 to notify the user that the voice control device 1001 is found as a result of the device search. When the user presses an OK button on the screen 601, a screen 602 is displayed on the display unit 408 of the printing apparatus 1004. Information to be obtained by the device search includes, for example, a uniform resource locator (URL) of the server 1006 compatible with the voice control device 1001. The printing apparatus 1004 uses the URL, and thus, can display the screen 602 for signing into the server 1006. The printing apparatus 1004 can sign into the server 1006 using information pieces (the user ID and the password) input to the screen 602. By the above-described processing, the printing apparatus 1004 can handle image data managed in the server 1006.

When the voice control device 1001 compatible with the server 1007 is found by the device search performed by the printing apparatus 1004, the printing apparatus 1004 can display a screen for signing in to the server 1007.

Different processing can be performed as processing by the printing apparatus 1004 to sign into the server 1006. An example of the different processing is described. First, it is assumed that the mobile terminal 1002 is in a state of completing sign-in to the server 1006. For example, it is assumed that a user has signed into the server 1006 using the above-described screen 506. When the mobile terminal 1002 finds the printing apparatus 1004 via the AP 1005, the mobile terminal 1002 displays identification information of the printing apparatus 1004 and a registration button. For example, the registration button can be displayed next to the printing apparatus 1004 on the screen 507. When the user presses the registration button, a registration request is transmitted from the mobile terminal 1002 to the printing apparatus 1004. The registration request includes destination information of the server 1006.

When receiving the registration request, the printing apparatus 1004 displays a selection screen for whether to execute printer registration processing on the display unit 408 of the printing apparatus 1004. When the user selects execution of the registration processing, the printing apparatus 1004 transmits the registration request including a MAC address of the printing apparatus 1004 to the server 1006 based on the destination information included in the registration request. The printing apparatus 1004 receives a response corresponding to the registration request from the server 1006. The response includes a URL regarding the registration processing of the printing apparatus 1004. In other words, the URL is a dedicated URL regarding the registration processing of the printing apparatus 1004.

The printing apparatus 1004 transmits the response received from the server 1006 to the mobile terminal 1002. The mobile terminal 1002 transmits the registration request to the server 1006 using the URL included in the received response. The registration request includes the user ID and the password already input to the mobile terminal 1002 to sign in to the server 1006. When the server 1006 that receives the registration request receives the correct user ID and password, the server 1006 transmits a response indicating that the registration request is successful to the mobile terminal 1002. In other words, the server 1006 receives the registration request using the dedicated URL regarding the registration processing of the printing apparatus 1004 and thus temporarily registers the printing apparatus 1004 as a printing apparatus for the user who signed in the mobile terminal 1002 at this point of time. In other words, the server 1006 manages the user ID and the MAC address of the printing apparatus 1004 by associating with each other. The mobile terminal 1002 transmits completion information indicating that the registration is completed to the printing apparatus 1004. When receiving the completion information, the printing apparatus 1004 transmits a registration request including the MAC address of the printing apparatus 1004 to the server 1006. The server 1006 identifies that the printing apparatus 1004 is in a temporary registration state and returns a registration completion response.

By the above-described processing, the server 1006 properly registers the printing apparatus 1004 as the printing apparatus for the user who signed in the mobile terminal 1002. When the registration completion response is received from the server 1006, the printing apparatus 1004 transmits information indicating completion of registration to the mobile terminal 1002. By the above-described processing, the printing apparatus 1004 may be able to handle image data managed in the server 1006.

[Print Instruction Processing Flow]

Figure 7:
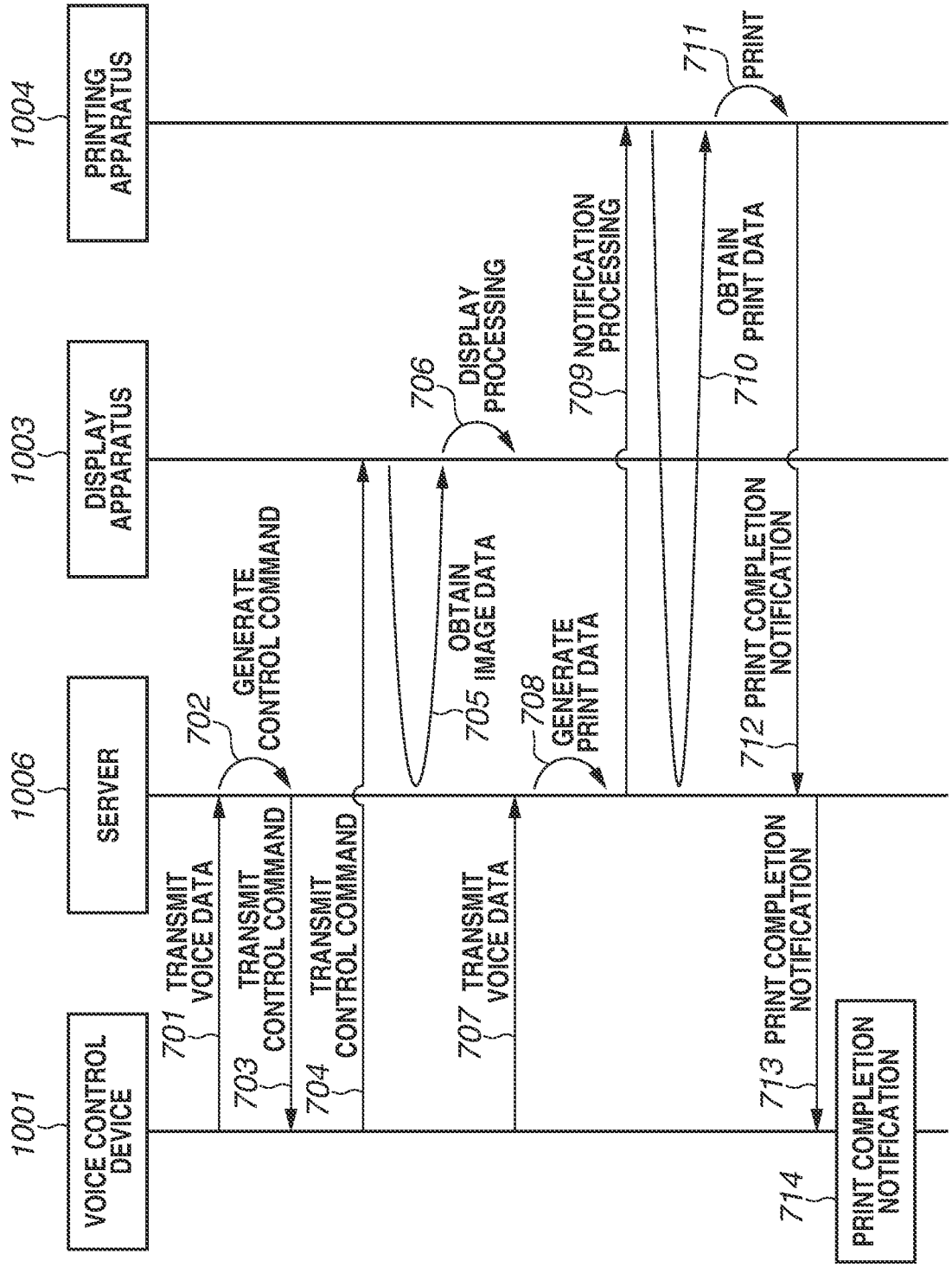
FIG. 7 is a sequence diagram related to print processing.

Next, processing for issuing a print instruction to the printing apparatus 1004 via the voice control device 1001 is described with reference to FIG. 7. FIG. 7 is a sequence diagram illustrating processing that the voice control device 1001 causes the printing apparatus 1004 to execute print processing based on a print instruction spoken by a user. In the present processing, the CPU in each apparatus executes a corresponding program, and thus corresponding function is realized. It is assumed that the display apparatus 1003 has already signed in to the server 1006. Image data corresponding to a below-described picture A is stored for a user by the server 1006.

First, a user speaks a wake word that is a predetermined keyword and subsequently speaks what the user wants to do near the voice control device 1001. For example, the user speaks "Display the picture A" following the wake word. The voice control device 1001 receives a voice of the wake word and thus receives a voice to be spoken next. In other words, the voice control device 1001 receives a voice speaking "Display the picture A".

In processing 701, the voice control device 1001 transmits the identification information (for example, the MAC address) of the voice control device 1001 and voice data based on the received voice to the server 1006.

The server 1006 identifies the user ID associated with the MAC address from the MAC address of the voice control device 1001 and thus recognizes that the voice control device 1001 has already signed in thereto. The above-described access token can be used. In processing 702, the server 1006 analyzes the voice data transmitted from the voice control device 1001, generates a control command based on the voice data, and, in step processing 703, transmits the control command to the voice control device 1001. The control command includes a display processing command as a processing content to be executed and information indicating a storage location of the image data corresponding to the picture A to be a display target.

The voice control device 1001 selects a transmission target of the control command received from the server 1006. In this case, the user spoke "Display the picture A" as a request from the user, so that the voice control device 1001 selects the display apparatus 1003 as a transmission destination. In processing 704, the voice control device 1001 transmits the control command to the selected display apparatus 1003. The voice control device 1001 transmits the control command received from the server in the processing 704, however, can transmit a different command. In other words, the voice control device 1001 can generate a different command based on the control command received in the processing 703 and transmit the generated different command to the display apparatus 1003. The processing that the voice control device 1001 transmits the control command is described below (for example, the processing 704 in FIG. 10), a different command generated based on the control command can be transmitted in a similar way. In that case, the apparatus that receives the command can execute processing based on the different command.

The display apparatus 1003 executes processing based on the control command. In processing 705, the display apparatus 1003 first accesses the storage location included in the control command and obtains the image data corresponding to the picture A from the storage location. In processing 706, the display apparatus 1003 displays image data A corresponding to the picture A. When the control command includes a URL corresponding to the picture A, the display apparatus 1003 can access the URL and display a Web page including the picture A.

The user speaks the wake word and subsequently speaks what the user wants to do near the voice control device 1001 in a state in which the image data corresponding to the picture A is displayed on the display apparatus 1003. For example, the user speaks "Print the picture A displayed on the display apparatus 1003" following the wake word.

The voice control device 1001 receives a voice of the wake word and thus receives a voice to be spoken next. In other words, the voice control device 1001 receives the voice saying "Print the picture A displayed on the display apparatus 1003" and thus receives a print instruction by voice.

In processing 707, the voice control device 1001 transmits the voice data to the server 1006. Basic processing is similar to that in the processing 701.

The server 1006 analyzes the voice data transmitted from the voice control device 1001 and executes processing based on the voice data. Since the voice data of the voice saying "Print the picture A displayed on the display apparatus 1003" is received, in processing 708, the server 1006 generates print data based on the image data corresponding to the picture A.

When a print instruction from the user is a simple instruction as the above-described "Print the picture A displayed on the display apparatus 1003", the print instruction does not include information regarding a print setting. More specifically, the print instruction does not include print settings, such as the number of print sheets, a print size, a print direction, a page layout (page allocation), and double-sided/single-sided print, when the printing apparatus 1004 prints the picture A. According to the present exemplary embodiment, when the information regarding the print setting is not included in the voice data as a result of the voice data analysis, the voice control device 1001 uses a predetermined print setting as the print setting of an image. Details thereof are described below with reference to FIGS. 9A and 9B.

According to the present exemplary embodiment, a server different from the server 1006 can generate print data as the processing 708. For example, a manufacturer of the printing apparatus 1004 provides a print server installed with software for generating print data. The server 1006 requests the print server to generate print data, and the print server can generate the print data.

In processing 709, when generation of print data is completed, the server 1006 transmits a notification indicating that generation of print data is completed to the printing apparatus 1004.

When the notification indicating that generation of print data is completed is received, the printing apparatus 1004 accesses the server 1006 to obtain the print data in processing 710 and executes printing in processing 711.

When print processing is completed, in processing 712, the printing apparatus 1004 transmits a print completion notification to the server 1006, and, in processing 713, the server 1006 transmits the print completion notification to the voice control device 1001.

When the print completion notification is received, in processing 714, the voice control device 1001 notifies the user of print completion by voice.

[Configuration of Server 1006]

Figure 8:
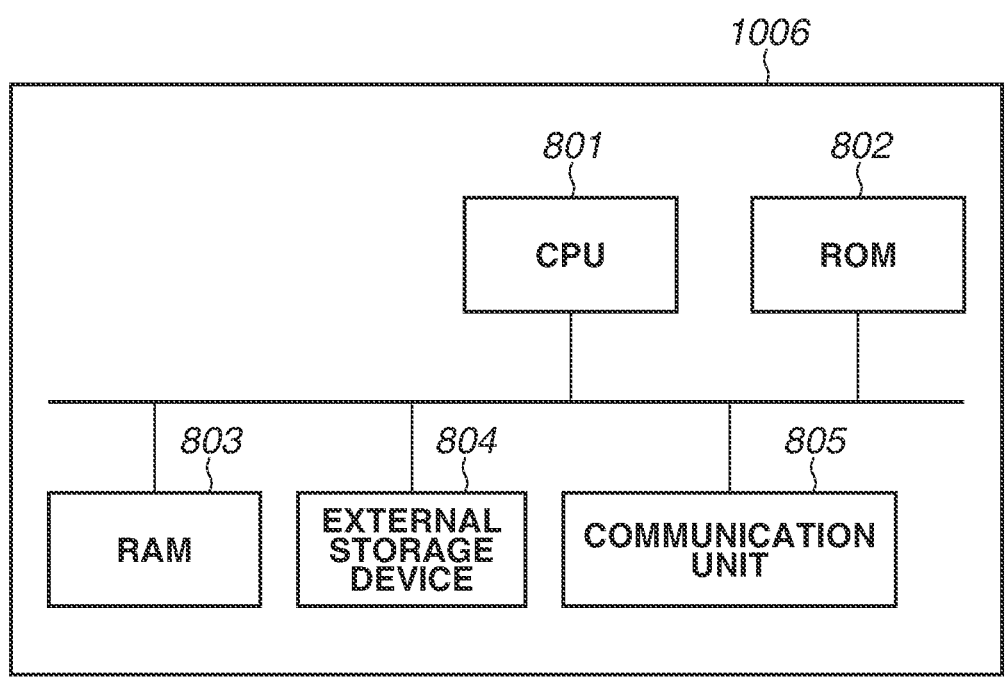
FIG. 8 illustrates an example of a hardware configuration of a server.

FIG. 8 is a hardware configuration diagram of the server 1006. The server 1006 is an information processing apparatus including a CPU 801, a ROM 802, a RAM 803, an external storage device 804, and a communication unit 805.

The CPU 801 is a system control unit and entirely controls the server 1006. According to the present exemplary embodiment, the server 1006 is configured as a single server, however, a plurality of information processing apparatuses can operate in cooperation with each other and establish a server system corresponding to the server 1006. The ROM 802 stores a control program executed by the CPU 801, a data table, fixed data of an embedded OS program, and the like. The RAM 802 can store data such as a program control variable without volatilizing the data since the data is retained by a primary battery for data backup, which is not illustrated. The external storage device 804 stores application software. In FIG. 7, the server 1006 generates print data as described above. Thus, the external storage device 804 of the server 1006 stores print software for generating print data that can be interpreted by the printing apparatus 1004. The communication unit 805 includes a circuit and an antenna for performing communication according to a predetermined wireless communication method.

[Detail of Processing by Voice Control Device 1001 and Server 1006]

Next, processing by the voice control device 1001 and the server 1006 when performing a print instruction is described with reference to FIG. 9A. A flowchart in FIG. 9A corresponds to the processing 707 to 714 in FIG. 7. In the voice control device 1001, the CPU 103 reads and executes a program regarding the processing in the flowchart from a memory, and thus the processing by the voice control device 1001 is executed. In the server 1006, the CPU 801 reads and executes a program regarding the processing in the flowchart from a memory, and thus the processing by the server 1006 is executed.

In step S901, the CPU 103 inputs a word (a voice) uttered by a user around the voice control device 1001 and generates voice data based on the input voice. In step S902, the voice data is transmitted from the voice control device 1001 to the server 1006.

When the voice data is received, the CPU 801 analyzes the voice data and specifies a user request. In step S903, the server 1006 receives the voice data corresponding to the user request such as "Print the picture A displayed on the display apparatus 1003" and determines whether the information regarding the print setting is included in the voice data.

When the information regarding the print setting is included in the voice data (YES in step S903), in step S904, the CPU 801 obtains the information regarding the print setting included in the voice data. When the information regarding the print setting is not included in the voice data (NO in step S903), in step S905, the CPU 801 obtains information regarding the predetermined print setting. In step S905, information (a value) regarding the print setting previously registered to the server is obtained as the information regarding the predetermined print setting.

In step S906, the CPU 801 specifies image data corresponding to the picture A displayed on the display apparatus 1003 based on the voice data and generates print data based on the image data by applying the obtained information regarding the print setting.

Next, in step S907, the CPU 801 selects a printer to execute print processing. According to the present exemplary embodiment, the CPU 801 specifies the user ID associated with the MAC address of the voice control device 1001. The server 1006 specifies the printing apparatus 1004 managed in association with the user ID. By the above-described processing, processing in step S907 is realized.

In step S908, the CPU 801 transmits a notification indicating that generation of the print data is completed to the printer selected in step S904 (i.e., the printing apparatus 1004). Subsequently, in step S909, the CPU 801 determines whether the print completion notification is received from the printing apparatus 1004.

In step S909, when the print completion notification is received from the printing apparatus 1004 (YES in step S909), the CPU 801 transmits the print completion notification to the voice control device 1001 as a print instruction source.

When the print completion notification is received, the CPU 103 notifies the user of the print completion by voice. More specifically, the CPU 103 converts the print completion notification into a voice and outputs the print completion by voice using the speaker 102.

By the above-described processing, a user can print a desired picture by a simple operation. When the instruction regarding the print setting is not included in the instruction by voice of the user, print data is generated by applying predetermined print setting.

According to a modification, when the information regarding the print setting is not included in voice data, a user can notified whether to perform printing using the predetermined print setting. More specifically, when the server 1006 determines that the information regarding the print setting is not included in the voice data, the server 1006 generates a control command for causing the voice control device 1001 to notify the user that printing is performed using the predetermined print setting. Subsequently, the server 1006 transmits the control command to the voice control device 1001, and the voice control device 1001 notifies the user by voice that printing is performed using the predetermined print setting according to the received control command. For example, the voice control device 1001 reads out "One copy of the picture A is printed on an L size photographic sheet by settings of (snip)". A plurality of items is included in print setting items necessary for generating print data. It is lengthy to read out all items, so that print setting items to be read out by voice may be only a part of representative setting items. In addition, the voice control device 1001 may ask a user about whether printing can be performed using the predetermined print setting in a question form like "Is it OK to print one copy of the picture A on an L size photographic sheet by settings of (snip)?" In the case of a question form, the print setting can be settled or changed by receiving a response to the question from the user. In other words, when a response for approving the print setting (for example, a response of "OK") is returned from the user, the voice control device 1001 transmits the voice data to the server 1006, and the server 1006 settles the print setting. When a response instructing a different print setting (for example, a response of "Print two copies") is returned from the user, the voice control device 1001 transmits the voice data to the server 1006. Subsequently, the server 1006 changes the print setting only for the setting item of the number of copies to which the change is instructed. When the print setting is changed, the server 1006 can cause the voice control device 1001 to notify the user of the changed print setting by voice.

The print setting can be notified to the user by display instead of by voice. In other words, the server 1006 can transmit a control command to the display apparatus 1003 and cause the display apparatus 1003 to display the print setting to be applied. Accordingly, the user can easily grasp with which print setting printing is performed. A screen displayed on the display apparatus 1003 can be configured to enable a user to change the print setting. More specifically, the server 1006 stores data of a print setting screen, and the display apparatus 1003 obtains the data of the print setting screen from the server 1006 and thus displays the print setting screen. Accordingly, the user can perform the print setting while looking at the screen.

The print setting item necessary for the server 1006 to generate print data includes a plurality of items as described above. Examples of the print setting items are illustrated in FIG. 13. When there are many print setting items as illustrated in FIG. 13, some users may specify only a part of the setting items by voice. More specifically, it is likely that only representative items are instructed such as "Print one copy of the picture A on an L size sheet". Thus, according to the present exemplary embodiment, it is desirable that whether information is included in the voice data is confirmed for each of the necessary print setting items, and a value of the predetermined print setting is applied only for an item not included in the voice data. A flow of the present processing is described with reference to FIG. 9B. In FIG. 9B, the processing in steps S901 and S902 is similar to that in FIG. 9A. In step S903, the CPU 801 determines whether the necessary print setting items are all included when determining whether the information regarding the print setting is included in the voice data. In other words, the CPU 801 specifies the print setting item included in the voice data and the print setting item not included in the voice data. When the print setting items are all included in the voice data (YES in step S903), in step S904, the CPU 801 obtains the information regarding the print setting in the voice data as with FIG. 9A. When a part of the print setting items is not included in the voice data (NO and "INCLUDING ONLY A PART OF ITEMS" in step S903), in step S905', the CPU 801 obtains the previously registered predetermined print setting values only for the item not included (a missing item) and obtains the information from the voice data for the item included in the voice data. When none of the information regarding the print setting is included in the voice data (NO and "NOT INCLUDING" in step S903), in step S905", the CPU 801 obtains the previously registered predetermined print setting values for all items. The subsequent processing is similar to that in FIG. 9A, and thus the description thereof is omitted. By the above-described processing, the server 1006 can respond when a user instructs only a part of the print setting items.

The server 1006 according to the present exemplary embodiment can include a plurality of print settings as the predetermined print setting as illustrated in FIG. 14. More specifically, it is desirable that the server 1006 includes different print settings according to data types of print targets. For example, desirable settings and general settings are different between a picture and a document (a document generated by document preparation software such as Microsoft Word). Thus, it is desirable that a plurality of print settings different for each data type is registered to the server 1006. In step S904, when an instruction regarding the print setting is not included in the voice data, the server 1006 identifies the data type of the print target. The data type can be identified based on, for example, an extension of the data file. The print setting corresponding to the identified data type can be obtained from the memory of the server 1006 based on the identification result. For example, when a data type is "picture", a "print setting 1" is selected, and when a data type is "document", a "print setting 2" is selected.

The server 1006 according to the present exemplary embodiment can include a plurality of print settings regardless of data types. For example, it is assumed that a user instructs "Print the document B on fine art paper" by voice. In this case, it is assumed that the user places importance on a beautiful print result more than a print speed. However, the "print setting 2" as the print setting for a document in FIG. 14 includes "print quality: standard", "double-sided/single-sided setting: double-sided", and "page layout: 2 pages/sheet". Thus, when the print setting items not instructed by the user are applied as they are, a print result may be different from that intended by the user. Therefore, it is desirable for the server 1006 according to the present exemplary embodiment to include a plurality of print settings in which setting information (a setting value) of at least a part of items is different with respect to one data type. Particularly, it is desirable that a plurality of print settings of which print quality, a color setting, a double-sided/single-sided setting, and the like are different is prepared according to sheet types. For example, in addition to the print settings 1 and 2 in FIG. 14, a "print setting 3" can be included as another print setting for "document" to which "sheet type: fine art paper", "print quality: fine", "double-sided/single-sided setting: single-sided", and "page layout: 1 page/sheet" are registered. A plurality of print settings is registered as described above, and thus when a user instructs "Print the document B on fine art paper", the server 1006 can select and obtain the "print setting 3" including setting values corresponding to the instruction. The print setting can be prepared for each sheet type based on information of the sheet type simply included in a voice instruction without referring to a data type. As described above, when only a part of the print setting items is instructed by a user, the server 1006 can select the print setting including the setting information corresponding to the instruction from a plurality of registered print settings. Accordingly, print data more appropriate to the user's intention can be generated.

According to the present exemplary embodiment, it is desirable that a registered value of the "predetermined print setting" can be changed by a user instruction. The predetermined print setting is determined according to the printing apparatus 1004 or the server 1006 to be signed in, and a default print setting is registered as an initial setting as long as the print setting is not changed. When a user wants to change the default print setting, the user instructs the voice control device 1001 by voice, so that the voice data is transmitted to the server 1006, and the print setting in the server 1006 is changed. In addition, the print setting in the server 1006 can be changed via a terminal device such as the mobile terminal 1002.

When the voice control device 1001 can specify a name of a user who requests printing from a voice saying "Print the picture A displayed on the display apparatus 1003", the voice control device 1001 can generate voice data by adding the user name. According to the processing, for example, the printing apparatus 1004 can display the user name during executing the print processing 711 or as a print history.

In addition, if a user speaks first the wake word and then what the user wants to do near the voice control device 1001 after notification of the print completion and before printing using other print data is instructed, the spoken contents can be reflected. For example, it is assumed that a user speaks an additional instruction of the number of copies like "One more sheet" or "Additionally print three more copies" following the wake word.

The voice control device 1001 that receives the additional instruction of the number of copies can transmit the voice data transmitted in the processing 707 again. In this regard, the voice data corresponding to "One more sheet" or "Additionally print three more copies" is transmitted together. The server 1006 receives these two voice data pieces and performs print data generation processing similar to the processing 708. Subsequently, the server 1006 sets the number of copies based on the voice data of the new request. By the above-described processing, the user can easily instruct reprint using the same image data. If a user speaks first the wake word and then what the user wants to do near the voice control device 1001 after notification of the print completion and before printing using other print data is instructed, the spoken contents can be reflected. For example, it is assumed that the user speaks "Print on a larger sheet" following the wake word. In response to receipt of the instruction, the voice control device 1001 can transmit the voice data transmitted in the processing 707 again. The voice data corresponding to "Print on a larger sheet" is transmitted together. The server 1006 receives these two voice data pieces and thus performs print data generation processing similar to the processing 708. Subsequently, the server 1006 sets the sheet size based on the voice data of the new request. By the above-described processing, the user can easily instruct to print the same image data on a sheet having a different size. When a different apparatus generates print data as described below, the apparatus that generates the print data can perform similar processing.

When an instruction by voice includes an instruction regarding a print speed, the server 1006 can change the print setting to be applied based on the instruction. Specifically, when a user instructs like "Print quickly", the server 1006 can determine that it is necessary to quickly finish printing and change the setting to perform printing in a speed priority mode. More specifically, even if the registered print setting includes a setting value corresponding to "fine" in the item of "print quality", it is desirable to change the setting value to that corresponding to "standard".

The server 1006 can analyze a setting value in a print instruction received in the past and reflect a user's preference regarding the print setting. More specifically, if the print setting of the page layout registered by default is a setting for laying out one page on one sheet, but a user often uses a setting for laying out two pages on one sheet, this setting can be reflected. In other words, a setting value of the registered page layout item can be changed to a setting value corresponding to "2 pages/sheet". In addition, the printing apparatus 1004 or the server 1006 can include a memory storing a voice keyword regarding printing. Thus, the voice control device 1001 downloads the voice keyword from the printing apparatus 1004 or the server 1006. Thus, the voice control device 1001 can accurately interpret a user's voice regarding a print instruction and generate voice data. Accordingly, the voice control device 1001 becomes strong in terms related to printing and can execute printing further adapted to a user's intention.

Next, a second exemplary embodiment is described. According to the first exemplary embodiment, an example was described in which the server 1006 generates print data, and the printing apparatus 1004 performs printing using the notification from the server 1006 indicating that the generation of the print data is completed with reference to FIGS. 7, 9A, and 9B. According to the present exemplary embodiment, an example is described in which the voice control device 1001 generates print data. In the following description, a part common to the first exemplary embodiment is omitted, and a part different from the first exemplary embodiment is mainly described.

Figure 10:
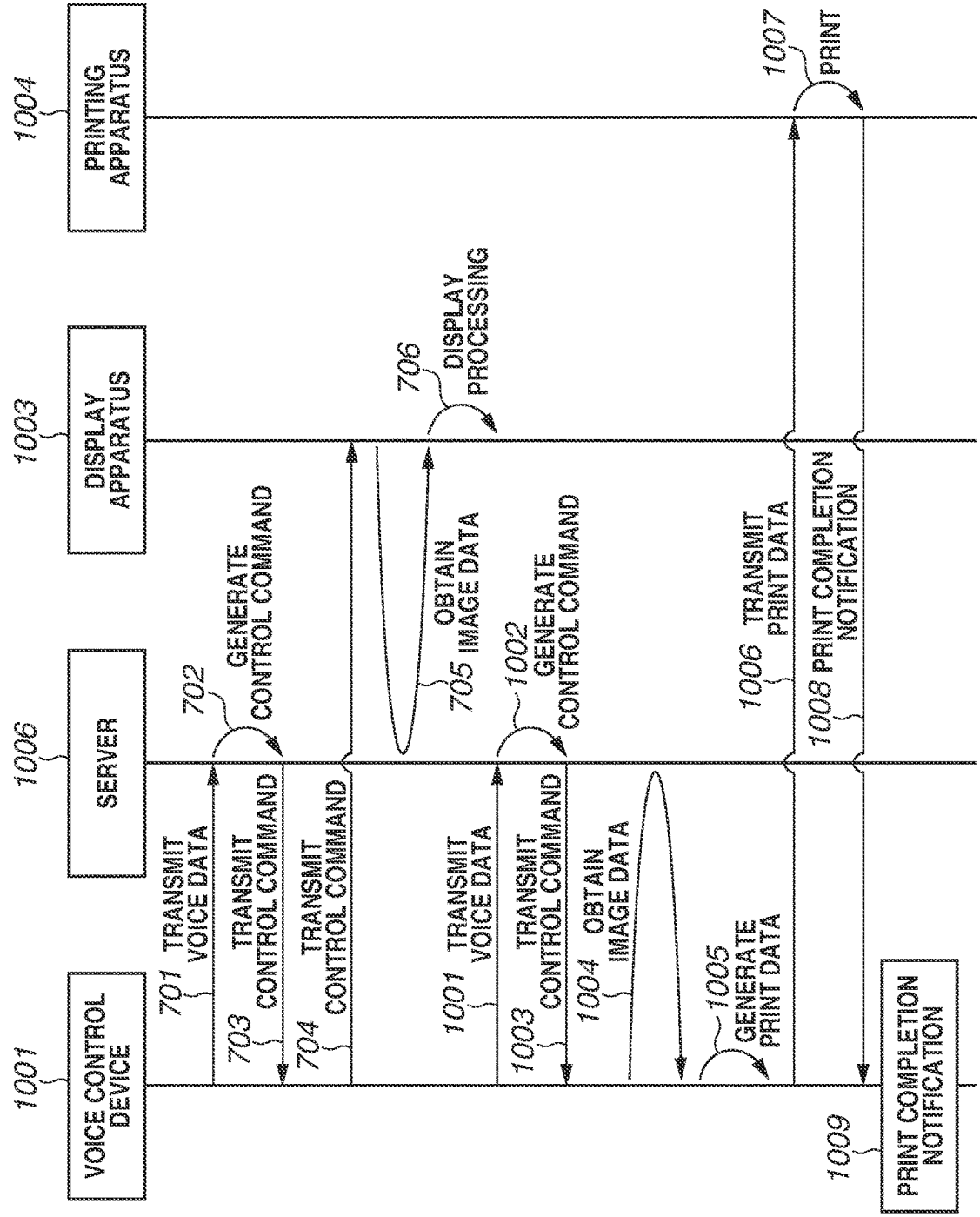
FIG. 10 is a sequence diagram related to print processing.
Figure 11:
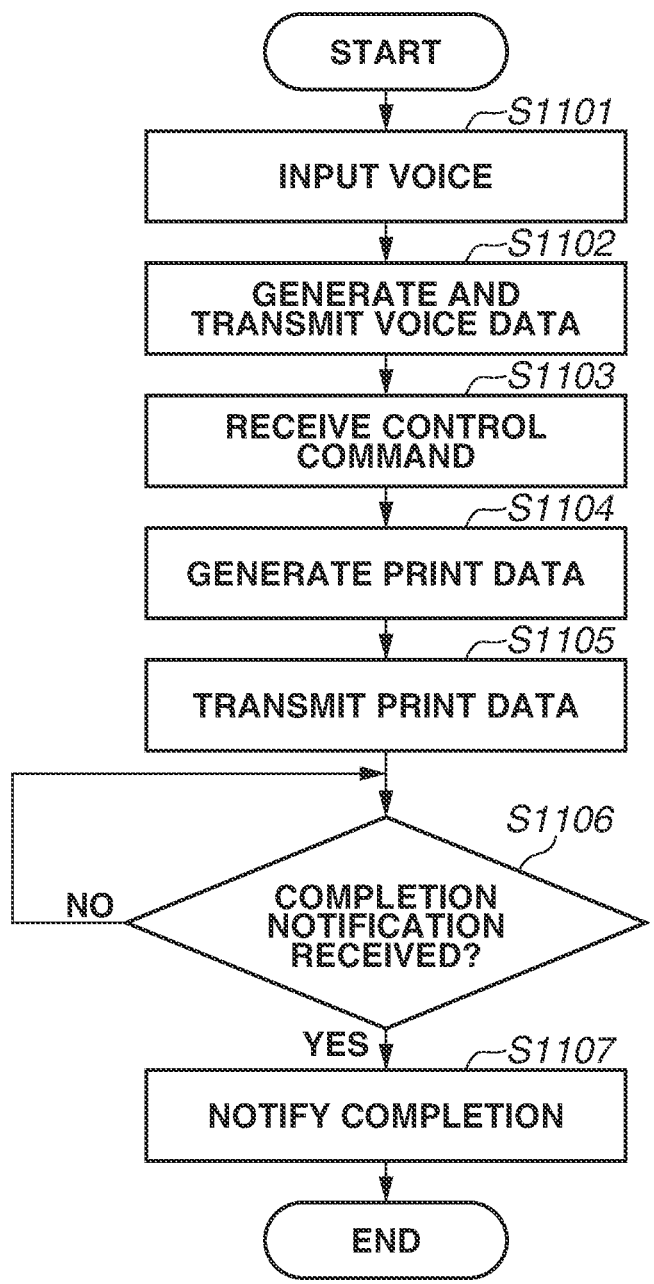
FIG. 11 is a flowchart illustrating an example of processing by the voice control device.

FIG. 10 is a sequence diagram illustrating print processing. The processing 701 to 706 is similar to that in FIG. 7, so that the detail description thereof is omitted. In FIGS. 10 and 11, the voice control device 1001 generates print data. Thus, the external storage device 107 of the voice control device 1001 stores print software for generating print data that can be interpreted by the printing apparatus 1004, information necessary for communication, and the like.

The voice control device 1001 receives a voice of the wake word and thus receives a word to be spoken next. In other words, the voice control device 1001 receives a voice saying "Print the picture A displayed on the display apparatus 1003".

In processing 707, the voice control device 1001 transmits the voice data to the server 1006.

The server 1006 analyzes the voice data transmitted from the voice control device 1001 and executes processing based on the voice data. The server 1006 receives the voice data of the voice saying "Print the picture A displayed on the display apparatus 1003". Thus, in processing 1002, the server 1006 generates a control command for printing the image data corresponding to the picture A.

In processing 1003, the server 1006 transmits the control command generated in the processing 1002 to the voice control device 1001.

The voice control device 1001 executes processing based on the control command Since the control command includes an instruction to obtain and print the image data corresponding to the picture A, in processing 1004, the voice control device 1001 obtains the image data corresponding to the picture A from the server 1006.

In processing 1005, the voice control device 1001 generates print data based on the obtained image data and the print setting information. As with the first exemplary embodiment, when a print instruction from a user is a simple instruction like "Print the picture A displayed on the display apparatus 1003", the information regarding the print setting is not included in the print instruction. Thus, according to the present exemplary embodiment, when the information regarding the print setting is not included in the instruction by voice, the predetermined print setting is used as the print setting of an image as with the first exemplary embodiment. More specifically, when the information regarding the print setting is not included in the control command, the voice control device 1001 generates the print data by applying the predetermined print setting previously registered to the voice control device 1001. Determination of whether the information regarding the print setting is included can be performed by the server 1006 instead of the voice control device 1001. In this case, the server 1006 determines whether the information regarding the print setting is included in the voice data from the voice control device 1001. When the information regarding the print setting is not included in the voice data, the server 1006 can generate a control command by applying the previously registered predetermined print setting. The voice control device 1001 can generate print data based on the print setting included in the control command.

In processing 1006, the voice control device 1001 transmits the print data generated in the processing 1005 to the printing apparatus 1004.

When print processing based on the print data is completed in processing 1007, in processing 1008, the printing apparatus 1004 transmits the print completion notification to the voice control device 1001.

In processing 1009, when the print completion notification is received, the voice control device 1001 notifies the user of the print completion by voice.

[Details of Processing by Voice Control Device 1001]

Next, processing by the voice control device 1001 is described with reference to FIG. 11. A flowchart in FIG. 11 corresponds to the processing 1001 to 1009 in FIG. 10.

Figure 9A:
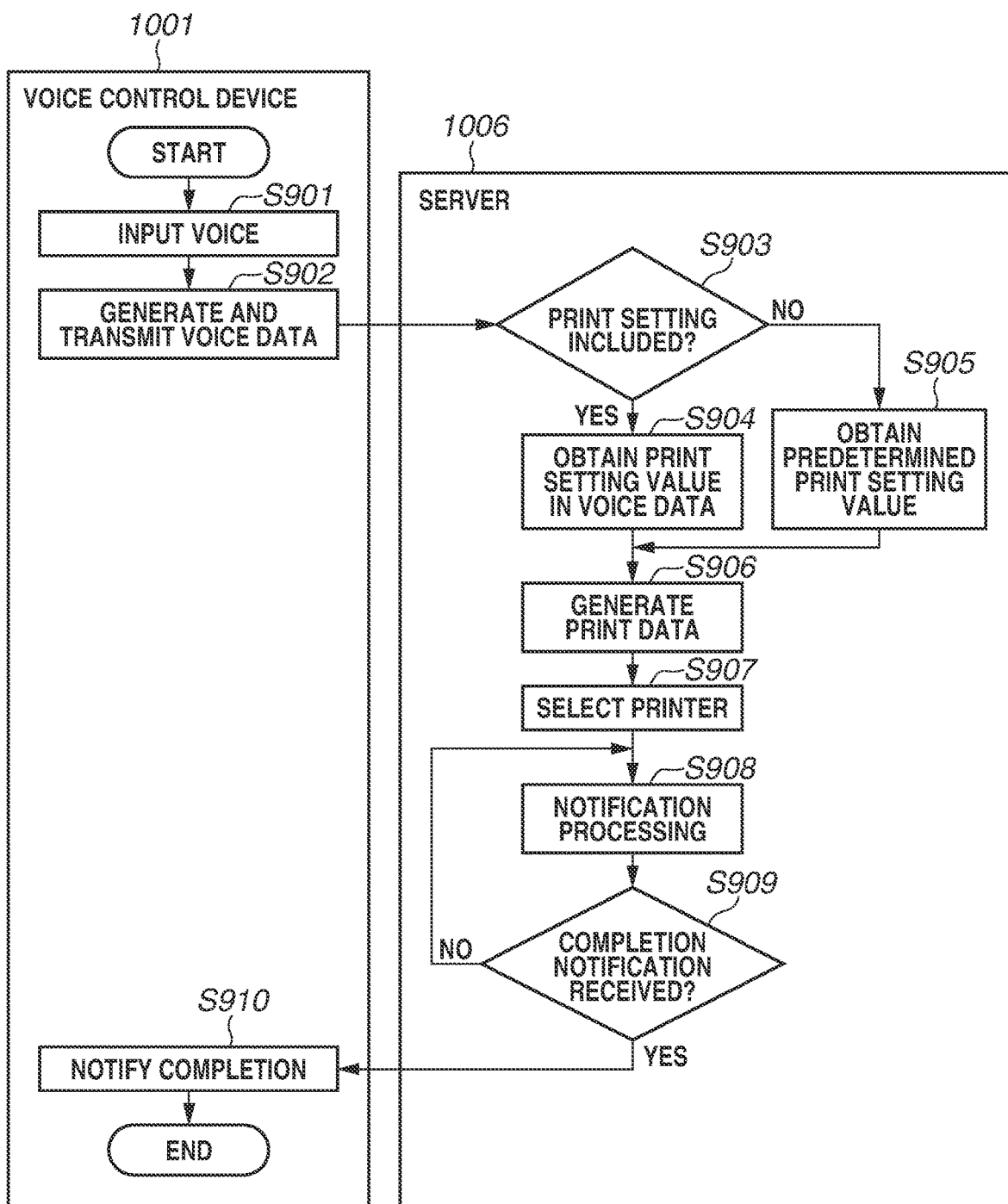
FIGS. 9A and 9B are flowcharts illustrating an example of processing by the voice control device and the server.
Figure 9B:
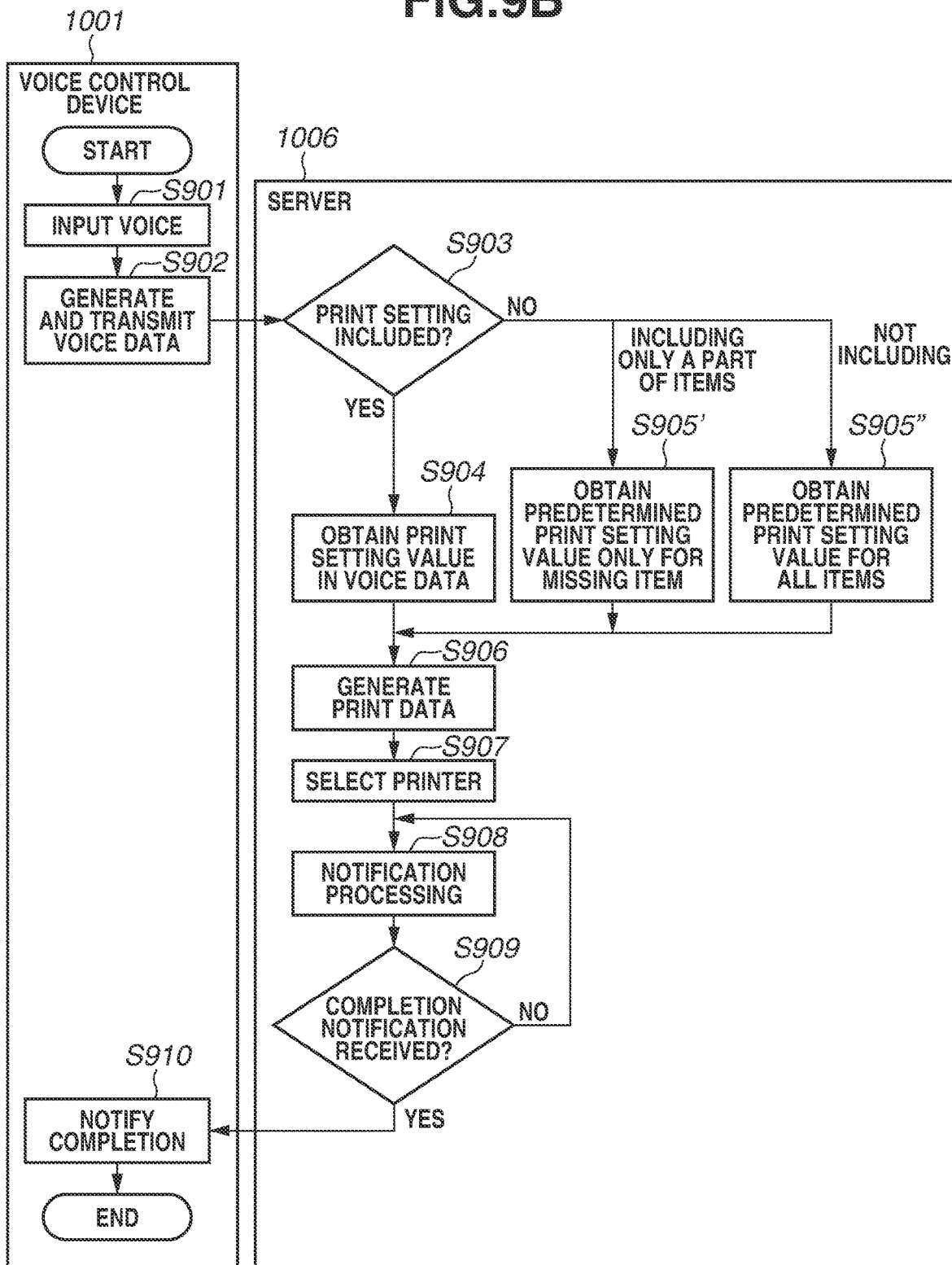

Processing in steps S1101 and S1102 in FIG. 11 is similar to that in steps S901 and S902 in FIGS. 9A and 9B, so that the detail description thereof is omitted.

In step S1103, the CPU 103 receives a control command from the server 1006. The CPU 103 analyzes the received control command and specifies processing to be executed next. The control command includes an instruction to obtain the image data of the picture A and a print instruction of the image data. Thus, in step S1104, the CPU 103 obtains the image data from the server 1006 and generates print data. In step S1104, as with the processing by the server 1006 according to the first exemplary embodiment, the CPU 103 can determine whether the information regarding the print setting is included in the instruction by voice from the user and perform processing for applying the predetermined print setting when the information regarding the print setting is not included. More specifically, the CPU 103 analyzes the control command and determines whether the information regarding the print setting is included in the control command. When the information regarding the print setting is included in the control command, the CPU 103 obtains the information regarding the print setting included in the control command. When the information regarding the print setting is not included in the control command, the CPU 103 obtains the information regarding the predetermined print setting. The CPU 103 obtains the information (value) regarding the print setting previously registered to the voice control device 1001 as the information regarding the predetermined print setting. The CPU 103 applies the obtained information regarding the print setting and generates print data. Determination of whether the information regarding the print setting is included can be performed by the server 1006 instead of the voice control device 1001. In this case, the server 1006 determines whether the information regarding the print setting is included in the voice data from the voice control device 1001. When the information regarding the print setting is not included in the voice data, the server 1006 generates a control command by applying the predetermined print setting previously registered thereto. Thus, the voice control device 1001 can generate the print data based on the print setting included in the control command.

In step S1105, the CPU 103 transmits the print data to the printing apparatus 1004. The CPU 103 registers the display apparatus 1003 and the printing apparatus 1004 as apparatuses to be control targets of the voice control device 1001 based on the instruction via the screen 507 in the above-described FIG. 5. Thus, the CPU 103 determines the transmission destination of the print data to the printing apparatus 1004 based on the registration.

In step S1106, the CPU 103 determines whether the print completion notification is received. When the print completion notification is received (YES in step S1106), in step S1107, the CPU 103 notifies the user of completion of printing by voice.

By the above-described processing, a user can print a desired picture by a simple operation. In addition, a load on the server 1006 can be reduced.

In the above-described example, the information regarding the predetermined print setting is registered to the voice control device 1001. However, the server 1006 can store the information regarding the predetermined print setting. In other words, the server 1006 determines in the processing 1001 whether the information regarding the print setting is included in the voice data from the voice control device 1001. When it is determined that the information regarding the print setting is not included in the voice data, the server 1006 includes the information regarding the predetermined print setting previously registered to the server 1006 in the control command. Subsequently, the server 1006 transmits the control command to the voice control device 1001. The voice control device 1001 can generate the print data based on the received control command.

According to the present exemplary embodiment, the processing similar to that of each example in the modification of the first exemplary embodiment can be executed by replacing the processing regarding the print setting of the server 1006 described in the modification of the first exemplary embodiment to that of the voice control device 1001. According to the modification, the description of processing similar to that according to the first exemplary embodiment is omitted, and a part different from the first exemplary embodiment is mainly described below.

According to the present exemplary embodiment, when the information regarding the print setting is not included in a print instruction by voice, a user can be notified whether to perform printing using the predetermined print setting. More specifically, when the voice control device 1001 determines that the information regarding the print setting is not included in the print instruction by user's voice or the control command, the voice control device 1001 can notify the user by voice that printing is performed using the predetermined print setting. The server 1006 can determine whether the information regarding the print setting is included in the voice data and transmit a control command for notifying a user of that printing is performed using the predetermined print setting to the voice control device 1001. In addition, notification can be made to a user in a question form as with the first exemplary embodiment, and the print setting can be settled or changed by receiving a response to the question from the user. According to the present exemplary embodiment, the print setting can be notified to a user by display instead of voice. More specifically, the voice control device 1001 or the server 1006 can transmit a control command to the display apparatus 1003 and cause the display apparatus 1003 to display the print setting to be applied.

The voice control device 1001 or the server 1006 can confirm whether the information is included in the instruction for each of the necessary print setting items. In other words, the voice control device 1001 can generate print data by applying the value of the predetermined print setting previously registered to the voice control device 1001 or the server 1006 for the item not included in the voice. As illustrated in FIG. 14, it is desirable that the voice control device 1001 or the server 1006 can include a plurality of print settings. The voice control device 1001 or the server 1006 can select the predetermined print setting therefrom based on the print instruction. The voice control device 1001 or the server 1006 can include a plurality of print settings for one data type. It is desirable that the predetermined print setting can be changed according to a user instruction.

When the voice control device 1001 can specify a name of a user who requests printing from a voice saying "Print the picture A displayed on the display apparatus 1003", the voice control device 1001 can generate voice data by adding the user name.

If a user additionally instructs the number of copies by voice after notification of the print completion and before printing using other print data is instructed, reprint using the same image data can be executed. If a user instructs a different print setting by voice after notification of the print completion and before printing using other print data is instructed, reprint using the same image data by the different print setting can be executed.

When an instruction by voice includes an instruction regarding a print speed, the voice control device 1001 or the server 1006 can change the print setting to be applied based on the instruction. The voice control device 1001 or the server 1006 can analyze a setting value in a print instruction received in the past and reflect a user's preference regarding the print setting. In other words, the value of the registered predetermined print setting can be changed based on the analyzed result.

Next, a third exemplary embodiment is described. According to the present exemplary embodiment, an example is described in which the display apparatus 1003 generates print data. In the following description, a part common to the first exemplary embodiment is omitted, and a part different from the first exemplary embodiment is mainly described.

Figure 12:
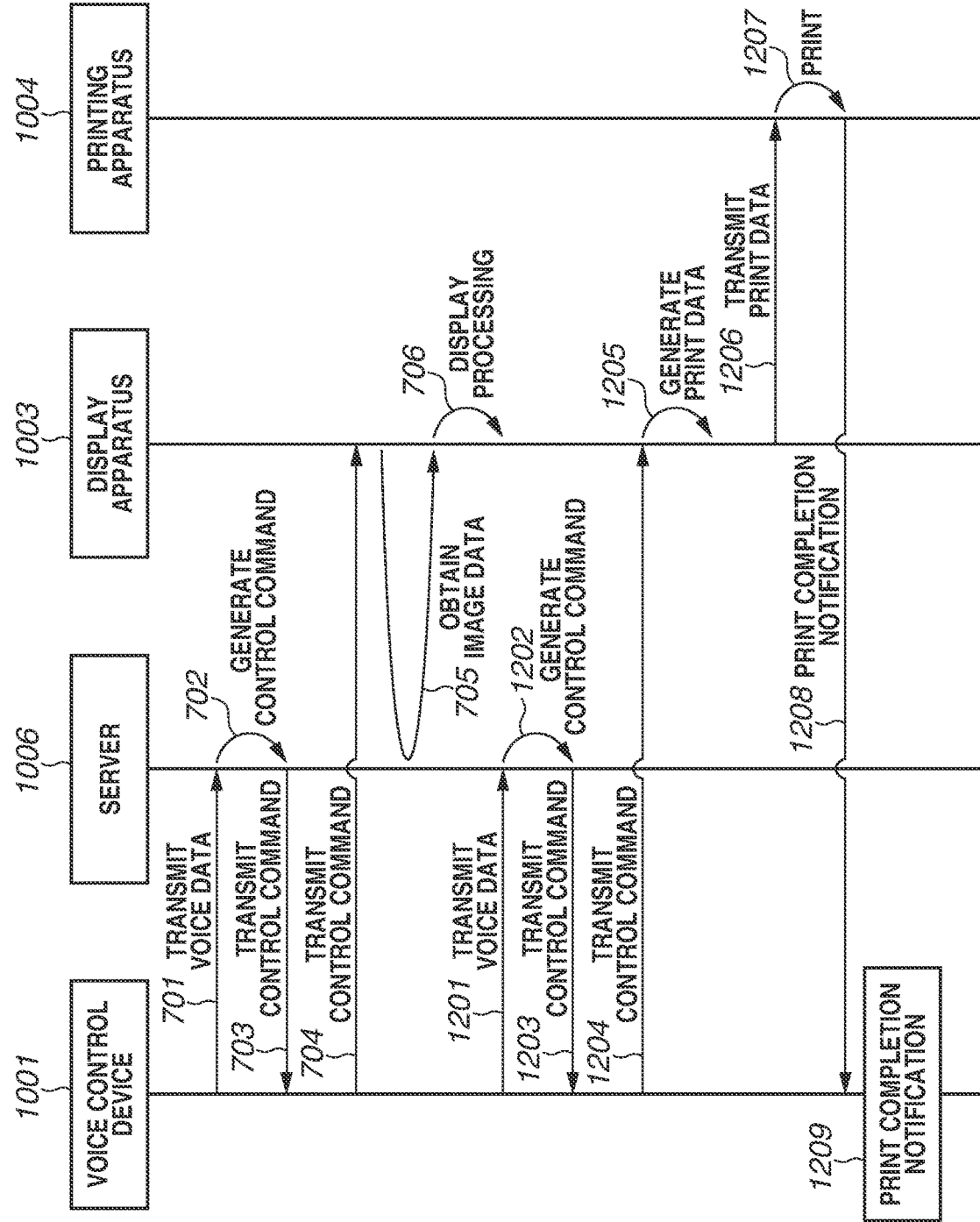
FIG. 12 is a sequence diagram related to print processing.

FIG. 12 is a sequence diagram illustrating print processing. The processing 701 to 706 is similar to that in FIG. 7, so that the detail description thereof is omitted. Processing 1201 to 1203 and processing 1207 to 1209 are respectively similar to the processing 1001 to 1003 and the processing 1007 to 1009 in FIG. 10, so that the detail descriptions thereof are omitted. In the processing in FIG. 12, the display apparatus 1003 generates print data. Thus, the external storage device 207 of the display apparatus 1003 stores print software for generating print data that can be interpreted by the printing apparatus 1004, information necessary for communication, and the like.

The voice control device 1001 executes processing based on a control command. The control command includes an instruction to obtain and print the image data corresponding to the picture A. In FIG. 12, the display apparatus 1003 generates print data. Thus, in processing 1204, the voice control device 1001 transmits the control command to the display apparatus 1003.

The display apparatus 1003 executes processing based on the received control command. In processing 1205, the display apparatus 1003 already obtains the image data for display and thus generates print data based on the already obtained image data. As with the first and the second exemplary embodiments, when a print instruction from a user is a simple instruction like "Print the picture A displayed on the display apparatus 1003", the information regarding the print setting is not included in the print instruction. Thus, according to the present exemplary embodiment, when the information regarding the print setting is not included in the instruction by voice, the predetermined print setting is used as the print setting of an image as with the first and the second exemplary embodiments. More specifically, the display apparatus 1003 generates print data by applying the predetermined print setting previously registered to the display apparatus 1003. The CPU 203 of the display apparatus 1003 analyzes the control command and determines whether the information regarding the print setting is included in the control command. When the information regarding the print setting is included in the control command, the CPU 203 obtains the information regarding the print setting included in the control command. When the information regarding the print setting is not included in the control command, the CPU 203 obtains the information regarding the predetermined print setting. The information (the value) regarding the print setting previously registered to the display apparatus 1003 is obtained as the information regarding the predetermined print setting. The CPU 203 applies the obtained information regarding the print setting and generates print data. On this occasion, the display apparatus 1003 can display the information regarding the print setting on the display unit 205. Determination of whether the information regarding the print setting is included can be performed by the server 1006 or the voice control device 1001 instead of the display apparatus 1003. When the server 1006 performs determination, the server 1006 determines whether the information regarding the print setting is included in the voice data from the voice control device 1001. When the information regarding the print setting is not included in the voice data, the server 1006 generates a control command by applying the predetermined print setting previously registered thereto. Thus, the display apparatus 1003 can generate print data based on the print setting included in the control command. When the voice control device 1001 performs determination, the voice control device 1001 analyzes the received voice or the control command obtained in the processing 1023 and determines whether the information regarding the print setting is included. When the information regarding the print setting is not included, the voice control device 1001 generates the voice data or the control command by applying the predetermined print setting previously registered thereto. Accordingly, the display apparatus 1003 can generate the print data based on the print setting included in the voice data or the control command.

In processing 1206, the display apparatus 1003 transmits the print data generated in the processing 1205 to the printing apparatus 1004.

By the above-described processing, a user can print a desired picture by a simple operation. In addition, loads on the server 1006 and the voice control device 1001 can be reduced.

In the example described above, the information regarding the predetermined print setting is registered to the display apparatus 1003. However, the server 1006 can store the information regarding the predetermined print setting therein. In other words, the server 1006 determines in the processing 1001 whether the information regarding the print setting is included in the voice data from the voice control device 1001. When it is determined that the information regarding the print setting is not included in the voice data, the server 1006 includes the information regarding the predetermined print setting previously registered to the server 1006 in the control command and transmits the control command to the display apparatus 1003 directly or via the voice control device 1001. Subsequently, the display apparatus 1003 can generate the print data according to the received control command.

According to the present exemplary embodiment, the processing similar to that of each example in the modification of the first exemplary embodiment can be executed by replacing the processing regarding the print setting of the server 1006 described in the modification of the first exemplary embodiment to that of the display apparatus 1003.

According to the modification, the description of processing similar to that according to the first exemplary embodiment is omitted, and a part different from the first exemplary embodiment is mainly described below.

According to the present exemplary embodiment, when the information regarding the print setting is not included in voice data, a user can be notified whether to perform printing using the predetermined print setting. More specifically, when the display apparatus 1003 determines that the information regarding the print setting is not included in the print instruction by user's voice, the voice control device 1001 can notify the user by voice of that printing is performed using the predetermined print setting. Of course, either the voice control device 1001 or the server 1006 can determine whether the information regarding the print setting is included. In addition, notification can be made to a user in a question form as with the first exemplary embodiment, and the print setting can be settled or changed by receiving a response to the question from the user. According to the present exemplary embodiment, the print setting can be notified to a user by display instead of by voice. More specifically, the voice control device 1001 or the server 1006 can transmit a control command to the display apparatus 1003 and cause the display apparatus 1003 to display the print setting to be applied.

Any of the display apparatus 1003, the server 1006, or the voice control device 1001 can confirm whether the information is included in the instruction for each of the necessary print setting items. Subsequently, the display apparatus 1003 can generate print data by applying the value of the predetermined print setting previously registered to any of the display apparatus 1003, the server 1006, or the voice control device 1001 for the item not included in the voice.

As illustrated in FIG. 14, it is desirable that any of the display apparatus 1003, the server 1006, or the voice control device 1001 can include a plurality of print settings. Any of the display apparatus 1003, the server 1006, or the voice control device 1001 can select the predetermined print setting therefrom based on the print instruction. Any of the display apparatus 1003, the server 1006, or the voice control device 1001 can include a plurality of print settings for one data type. It is desirable that the predetermined print setting can be changed based on a user instruction.

When the voice control device 1001 can specify a name of a user who requests printing from a voice saying "Print the picture A displayed on the display apparatus 1003", the voice control device 1001 can generate voice data by adding the user name.

If a user additionally instructs the number of copies by voice after notification of the print completion and before printing using other print data is instructed, reprint using the same image data can be executed. If a user instructs a different print setting by voice after notification of the print completion and before printing using other print data is instructed, reprint using the same image data by the different print setting can be executed.

When an instruction by voice includes an instruction regarding a print speed, any of the display apparatus 1003, the server 1006, or the voice control device 1001 can change the print setting to be applied based on the instruction. Any of the display apparatus 1003, the server 1006, or the voice control device 1001 can analyze a setting value in a print instruction received in the past and reflect a user's preference regarding the print setting. In other words, the value of the registered predetermined print setting can be changed based on the analyzed result.

The above-described exemplary embodiments are to print a picture displayed on the display apparatus 1003, however, printing can be instructed by another embodiment.

For example, it is assumed that a user speaks "Print the file A" following the wake word. The voice control device 1001 or the printing apparatus 1004 transmits voice data corresponding to the voice saying "Print the file A" to the server 1006. The server 1006 can search data named "file A" from data pieces managed for the user and generate print data.

According to the above-described exemplary embodiments, the case is described in which image data corresponding to a picture is printed, however, data to be a print target can be document data without being limited to image data.

The above-described exemplary embodiments cause the printing apparatus 1004 to perform printing based on a print instruction spoken by a user. However, the printing apparatus 1004 can execute print processing based on print data generated by an instruction other than by voice with respect to print software (for example, a printer driver) installed in a personal computer. An instruction other than by voice is an instruction issued by an operation using a mouse and an operation using a touch panel.

According to the above-described exemplary embodiments, Bluetooth® is described as an example of the short-range wireless communication, however, another communication method can be used. For example, Wi-Fi Aware™ can be used instead of Bluetooth®.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, an operation load of a print instruction on a user can be reduced.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

What is claimed is:

1. A system comprising:
a server system; and
a printing apparatus,
wherein the server system includes at least one processor and at least one memory storing instructions that, when executed by the at least one processor, cause the server system to:
obtain control information based on voice data that is transmitted by a voice control device that is provided outside of the printing apparatus, in a case where print instruction by voice is received by the voice control device,
obtain print target data based on the obtained control information,
wherein the printing apparatus includes at least one processor and at least one memory storing instructions that, when executed by the at least one processor, cause the printing apparatus to:
receive print data that is generated using the print target data and a print setting that is previously stored in the server system before the print instruction by voice; and
execute print processing based on the print data,
wherein registration processing is performed based on first processing in which the printing apparatus outputs first information based on user instruction, and second processing in which the printing apparatus is registered in the server system in a case where a request is transmitted, to the server system, by a terminal device using second information that is input into the terminal device after the printing apparatus outputs the first information, the terminal device being provided outside of the voice control device and the printing apparatus, and the first information and the second information being same information, and
wherein, after completing the registration processing, the voice control device and the printing apparatus are linked and whereby the printing apparatus is able to receive the print data.

2. The system according to claim 1,
wherein the print setting includes a plurality of setting items respectively corresponding to a plurality of setting values,
wherein, in a case where the voice data includes the first information corresponding to a first setting item, a setting value corresponding to the first information included in the voice data is used for generating the print data.

3. The system according to claim 1,
wherein the print setting includes a plurality of setting items respectively corresponding to a plurality of setting values, and
wherein, in a case where the voice data does not include the first information corresponding to a first setting item and includes the second information corresponding to a second setting item, a setting value corresponding to the first setting item and previously stored in the server system and a setting value based on the second information included in the voice data are used for generating the print data.

4. The system according to claim 1, further comprising:
a first print setting previously stored in the server system is used when print target data of a first data type is used for generating the print data, and
a second print setting different from the first print setting, and previously stored in the server system is used when print target data of a second data type different from the first data type is used for generating the print data.

5. The system according to claim 1, wherein the print setting previously stored in the server system can be changed based on a user instruction.

6. The system according to claim 1, wherein the obtained first information includes information associated to the print target based on the voice data.

7. The system according to claim 1, wherein the at least one processor of the server system further comprises at least one memory storing instructions, that when executed by at least one processor, cause the server system to transmit a command, and wherein transmitting a command is for notifying a user of a print setting based on the voice data.

8. The system according to claim 1, wherein information based on a received print instruction is analyzed and a print setting to be used is changed based on an analyzed result.

9. The system according to claim 1, wherein communication compliant with IEEE 802.11 standard series is executable between the voice control device and the terminal device.

10. The system according to claim 1, wherein communication compliant with Bluetooth is executable between the voice control device and the terminal device.

11. The system according to claim 1, wherein, after the registration processing is completed the print data based on the voice data is able to be generated.

12. The system according to claim 1,
wherein a uniform resource locator (URL) for registering is output as the first information in the first processing, and
wherein the URL is input into the terminal device and the terminal device transmits the request.

13. A control method executed by at least one processor in a system comprising a server system and a printing apparatus, the method comprising:
obtaining control information based on voice data that is transmitted by a voice control device that is provided outside of the printing apparatus, in a case where print instruction by voice is received by the voice control device;
obtaining print target data based on the obtained control information;
receiving print data that is generated using the print target data and a print setting that is previously stored in the server system before the print instruction by voice; and
executing print processing based on the print data,
wherein registration processing is performed based on first processing in which the printing apparatus outputs first information based on user instruction, and second processing in which the printing apparatus is registered in the server system in a case where a request is transmitted, to the server system, by a terminal device using second information that is input into the terminal device after the printing apparatus outputs the first information, the terminal device being provided outside of the voice control device and the printing apparatus, and the first information and the second information being same information, and wherein, after the registration processing is completed, the voice control device and the printing apparatus are linked and whereby the print data based on the voice data is able to be generated.

14. A system comprising:
a voice control device,
a server system; and
a printing apparatus,
wherein the voice control device includes at least one processor and at least one memory storing instructions that, when executed by the at least one processor, cause the voice control system to:
receive print instruction by voice; and
transmit voice data based on the received print instruction,
wherein the server system includes at least one processor and at least one memory storing instructions that, when executed by the at least one processor, cause the server system to:
obtain control information based on the voice data; and
obtain print target data based on the obtained control information,
wherein the printing apparatus includes at least one processor and at least one memory storing instructions that, when executed by the at least one processor, cause the printing apparatus to:
receive print data that is generated using the print target data and a print setting that is previously stored in the server system before the print instruction by voice; and
execute print processing based on the print data,
wherein registration processing is performed based on first processing in which the printing apparatus outputs first information based on user instruction, and second processing in which the printing apparatus is registered in the server system in a case where a request is transmitted, to the server system, by a terminal device using second information that is input into the terminal device after the printing apparatus outputs the first information, the terminal device being provided outside of the voice control device and the printing apparatus, and the first information and the second information being same information, and
wherein, after completing the registration processing, the voice control device and the printing apparatus are linked and whereby the printing apparatus is able to receive the print data.

* * * * *